Oct. 28, 1941.   H. H. CLARK   2,260,606
COILED SPRING
Filed Aug. 19, 1938

INVENTOR
HOWARD HOY CLARK
BY John F. Stark
ATTORNEY

Patented Oct. 28, 1941

2,260,606

UNITED STATES PATENT OFFICE 2,260,606

COILED SPRING

Howard Hoy Clark, Detroit, Mich., assignor to Eaton Manufacturing Company, Cleveland, Ohio, a corporation of Ohio Application August 19, 1938, Serial No. 225,669

3 Claims. (Cl. 267—61)

This invention relates to spring coiling and particularly concerns coil springs of the helical compression type.

The primary object of this invention is to provide a coil spring that effects a substantial saving of material over conventional practices.

A further object of this invention is to provide a coil spring having the pitch angle of the coils next adjacent the initial and final coils equal to or greater than the pitch of the intermediate coils.

A further object of this invention is to provide a coil spring whereby slight variation in the end coils thereof will have less effect on the rate of deflection and assures coil springs having substantial uniformity therein when produced in large quantities.

A further object of this invention is the provision of means for controlling the coiling of helical springs of the compression type, comprising a lead screw having the pitch angle next adjacent the initial and final turns thereof equal to or greater than the pitch of the turns of the intermediate portions thereof.

A still further object of this invention is to provide a helical spring consisting of a coil at either end of the spring lying in a generally helical formation, constant pitch coils in the central portion thereof lying in a second helical formation, and intermediate coils lying between the first and second mentioned helical formations having a third helical formation of a pitch equal to or greater than said second helical formation, and including seating portions formed in the end coils of said spring.

The above being among the objects of the present invention the same consists in certain novel features of construction and combinations of parts to be hereinafter described and then claimed, having the above and other objects in view.

Figures 1, 2:
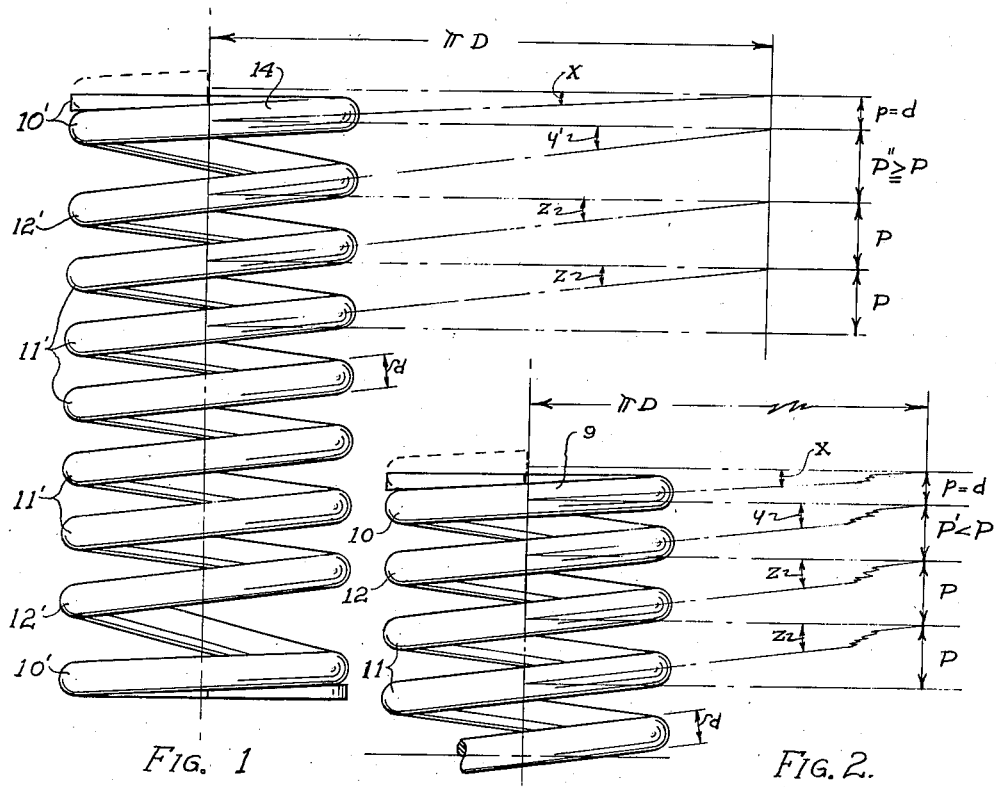
Figure 3:
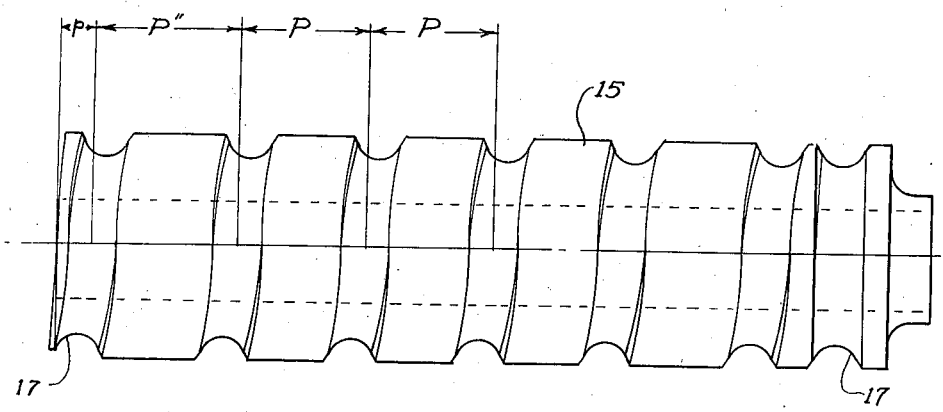

In the accompanying drawing which illustrates a suitable embodiment of the present invention and in which like numerals refer to like parts throughout the several different views, Fig. 1 represents a helical coil spring coiled after the teaching of this invention and illustrating somewhat diagrammatically the developed length of individual coils and the relationship between the pitch angle of adjacent coils effected by the teaching of this invention; and Fig. 2 is a similar view illustrating a conventionally coiled spring; and Fig. 3 illustrates one form of lead screw by which the subject matter of this invention is formed.

In the coiling of spring wire stock into the conformation of a helix to form a helical compression spring of approximately 4½ inches or less in coil diameter, and wherein the wire diameter exceeds approximately one-half of an inch, it is usually performed by what is known as the hot coil method. This invention comprehends the coiling of wire of relatively large diameter such as used for vehicle body suspension and the like, and hereinafter where the coiling operation or coiled spring is mentioned it will be understood to mean hot coiling as just explained for the reason that the problems and teaching of the prior art in regard to relatively small diameter bar stock, used to form numerous types of springs, are separate and distinct from this invention.

Conventionally the helically coiling of a spring as used, for example, in automotive vehicle body suspension is done from bar stock cut to approximately the developed length of the spring, the bar heated to working temperature, and coiled around an arbor under control of a lead screw of conventional design having one pitch angle for the end closing coils, a somewhat greater pitch angle for the constant pitch central coils, and a pitch angle of a magnitude somewhere between the first two mentioned angles for the coils intermediate the end closing coils and constant pitch central coils. It will be appreciated that in any conventional coiling machine it is not feasible to suddenly and sharply bend the wire to make the change in pitch angle effective at a given point, due to the inherent nature of the material; practically the coiling operation is accomplished by distributing the transition from the end pitch angle to the constant pitch angle throughout a portion of a coil.

The present invention proposes to accomplish this change in transition from the pitch angle of the closing ends to the constant pitch central coils by use of a lead screw with grooved turns having a transitional pitch angle between the aforementioned pitch angles that is equal to or greater than the constant pitch central turns, thereby providing more active coils in the spring than heretofore and reducing the number of inactive coils. And since rate varies inversely as the number of active coils in a spring it will be apparent that for a conventionally coiled spring and one coiled in the manner taught by the present invention to have the same instantaneous rate, i. e. the rate at a given deflection, it will be necessary to reduce the total number of coils in the spring, and hence will require less material.

Throughout the specification and claims where active and inactive coils are referred to it will be understood to mean that the active coils are those that are only partially collapsed under a normal load condition and still provide some torsional resistance to further compression, while the inactive coils comprise the initial and final coils of the spring, that are in a substantially closed condition under no load or become closed upon application of below normal loads and thereafter offer no resilient resistance to further compression.

To revert for the present to some considerations that should be explained concerning the rate of deflection of a helical compression spring, it has been generally regarded that the rate remains constant throughout the major portion of the total deflection. A formula that may be used to calculate the rate of round wire springs is substantially:

(1) $$R = \frac{Gd^4}{8D^3N}$$

where
G = shear modulus of elasticity
d = bar diameter
D = pitch diameter of coils
N = number of active coils
R = rate of deflection in pounds per inch.

The number of active coils in a spring has generally been conceded to be the total number of coils less a certain number of inactive coils, usually considered two coils. Actually the number of inactive coils in a conventional spring varies approximately as an exponential function of the ratio of the deflection at which the rate is taken to the total deflection of the spring. This exponential function may be shown approximately by the following power series:

(2) $$N_1 = A + B + Cr^2 + Dr^3 \text{ etc.}$$

where
$N_1$ = inactive coils
A, B, C, D, etc. = constants
r = ratio of deflection where rate is measured to the total available deflection of the spring.

As previously stated since the number of active coils in a spring equals the total number of coils less the inactive coils, it will be noted from Equations 1 and 2 above that for a given spring the rate of the spring will increase somewhat as the deflection increases. The amount of increase in rate will depend largely upon the manner in which the spring is coiled, because the rate at which the inactive coils increase with deflection depends upon the numerical values of the constants A, B, C, D, etc. of Equation 2.

Referring now to Fig. 2, as shown, one-half of a conventionally coiled spring 9 has the end coils 10 normally flattened or ground to provide flat bearing surfaces for contact with upper and lower spring seats, respectively, not shown. The dotted line above the coil indicates the position that would have been assumed by the material if it were not flattened out. It will be apparent that the major portion of these end coils are not subject to any torsional stress, and make no appreciable contribution to the deflection of the spring. Therefore, the foregoing explanation may be further clarified through a consideration of the physical effect of deflection upon the end coils 10, the central coils 11 of the spring 9, and the coils 12 intermediate the end coils and the central coils.

If the helix angle for the pitch of the end coil is X, and the helix angle for the constant pitch central coils is Z, it is apparent that a bending moment in a plane normal to the plane of the helix must have operated to change the pitch angle from X to Z as the wire was coiled upon the lead screw. As previously mentioned, since in a conventional coiling machine it is not feasible to suddenly and sharply bend the wire to make a change in the pitch angle effective at a given point, the action of the coiling operation is to distribute the bending stresses over a portion of the intermediate coils 12. Therefore, in a conventionally coiled spring there exists a region at the end coils 10 having a pitch angle X, a region in the central coils 11 having a pitch angle Z, and a region of intermediate coils 12 between the end coils and the central coils, having a pitch angle Y varying from X to Z.

When a load is applied on spring 9 the helix angle X of the end coils 10 does not change because the major portion of these coils is not subject to the torsional stress of the load on account of their substantially closed nature. However, the application of the load does cause the helix angle Z of the constant pitch central coils 11 to decrease from Z to a lower value Y. The load also affects the pitch of the intermediate coils 12. That is to say, the variation in helix angle in the region of the intermediate coils 12 and near the end coils 10 is from X to Y whereas previously, before the load was applied, it was from X to Z.

The effect of the change in the helix angle variation, due to the load, is to cause the end coil pitch to extend itself into the intermediate region. Thus a greater proportion of the total coils will have a helix angle X under a loaded condition as described. Now the portion of the intermediate coil in the region of this helix angle transition near the end coil 10, having a pitch angle X, and which had a pitch angle Y slightly greater than X, attains a pitch angle of X when the load is applied, and thereafter contributes no further resistance to deflection when more load is applied. In other words more of the coils adjacent the end portions have been closed due to the deflection caused by the applied load, and in this condition the closed coils afford no resistance to torsion because of the resultant frictional pressure caused by the metal to metal contact of the closed coils.

Since the rate of a helical coil spring varies inversely as the number of effective or active coils therein, and the previous explanation indicates that, for a given number of total coils, the active coils decrease in a certain manner as the deflection increases, the instantaneous rate of a helical compression spring of a given number of total coils, varies as a certain function of the deflection, namely, an approximate exponential function as determined by numerous investigations.

With reference to Fig. 1 illustrating a similar view through a complete helical coil spring 14, but coiled after the teaching of the present invention, it will be noted that the previous explanation, relative to the effect of deflection upon the end coils 10' and the central coils 11' and the intermediate coils 12' between the end and central coils of the spring may be applied here. However, the pitch P'' of the first turn of wire after the initial turn for the closed end coil p, or the intermediate coils 12', is equal to or slightly greater than, the pitch P of the central coils 11' in the spring. This is due primarily to the fact that the pitch angle Y' is equal to or greater than pitch angle Z, whereas in the spring 9 previously described pitch angle Y was less than pitch angle Z. Referring back to Fig. 2 for the moment, it will be apparent that the pitch P' of the first turn of wire after the initial turn required for the closed end coil 10, or in other words, the intermediate coil 12, is smaller than the pitch P of the central coils in the spring. This decreased pitch P' is due to the distribution of the bending in the coiling operation, previously described, that causes the metal to creep back slightly after deformation to the coil conformation due to the inherent modulus of elasticity of the material.

Comparing the springs of Figs. 1 and 2 with due regard to the previous explanation it will be apparent that the spring of Fig. 2 has more inactive coils than the spring of Fig. 1. From this it follows that for a given deflection the spring of Fig. 1 will have a lesser instantaneous rate than that of the spring of Fig. 2, assuming that the total number of coils is the same in each instance. Therefore, since rate varies inversely as the number of active coils in a spring, it follows that for the spring of Fig. 1 to have the same rate as that of Fig. 2, it will be necessary to decrease the total number of coils in the spring of Fig. 1. Consequently, the spring in Fig. 1 will require less material than that in Fig. 2.

In Fig. 3 a lead screw 15 for effecting the teaching of the present invention is shown. As is well known to those skilled in the art the pitch of the turns on the screw controls the pitch of the spring coiled thereby, such as the spring 14 of Fig. 1. The screw 15 has a pitch $p$ for one turn at either end substantially equal to the closed end of the resulting spring. The next turn at each end of the screw has a pitch P'' substantially greater than the pitch P of the constant pitch central turns of the screw. In one working model of this type of screw approximately 4 inches in diameter and 16 inches long the increase in the mentioned pitch of the first active turn exceeds the pitch of the central turns by 1/8 of an inch. The amount by which pitch P'' exceeds pitch P is so determined that the bending of the bar in a plane normal to the plane of the helix during the coiling operation will be distributed further back into the end coils, as compared with conventional methods of coiling, resulting in a spring of improved characteristics. It is to be understood, however, that this relatively backward distribution of the bending does not cause the ends of the spring to open, because of the fact that the end turns of the lead screw are formed in such a fashion, in accordance with another feature of this invention, that assures proper closing of the ends of the coil spring. This result is accomplished in the improved lead screw by having the initial coils 10' at each end of the spring 14 guided in corresponding turns 17 milled into the screw, thereby producing greater uniformity among individual springs coiled thereby than by conventional methods of coiling.

From the foregoing disclosure it will now be apparent that a coil spring of novel design incorporating coils of higher pitch intermediate the end coils and the constant pitch central coils has been described, thereby providing more active coils in the spring and likewise effecting a reduction in raw material therefor. Further the control of the end coils of a spring coiled by means of the teaching of this invention and of the next adjacent coils, due to the greater relative opening existing in the end coils, will cause slight mechanical variations in the forming of the end coils to have less effect upon the rate of the spring at a given deflection than a conventionally coiled spring, thereby rendering greater uniformity in the instantaneous rate of individual springs when produced in large quantities.

Obviously many modifications can be conceived that come within the broad scope of this invention, therefore, formal changes may be made in the specific embodiment of the invention described without departing from the spirit or substance of the broad invention, the scope of which is commensurate with the appended claims.

What I claim is:

1. In a hot coiled spring of the helical compression type formed of a length of wire, a substantially cylindrically shaped body comprising a series of coils lying in a normal helical formation adjacent the central portion of the longitudinal axis thereof, a second series of coils disposed axially on either side thereof distorted from said normal helical formation, and a third series of coils forming the end turns thereof having a pitch substantially equal to the diameter of said wire and providing a seating portion for said coil spring.

2. In a hot coiled spring of the helical compression type formed of a length of wire, said wire being flattened at either end a distance substantially equal to the coil diameter of the finished spring, said wire assuming the form of a cylindrically shaped body comprised of a plurality of coils lying in a normal helical formation adjacent the central portion of the longitudinal axis thereof, individual coils disposed axially on either side thereof distorted from said normal helical formation, and end closing coils adjacent said individual coils having a pitch substantially equal to the diameter of said wire.

3. In a hot coiled spring of the helical compression type formed of a length of wire, said wire being flattened at either end a distance substantially equal to the coil diameter of the finished spring, said wire assuming the form of a cylindrically shaped body comprised of a plurality of coils lying in a normal helical formation adjacent the central portion of the longitudinal axis thereof, individual coils disposed axially on either side thereof distorted from said normal helical formation, end closing coils adjacent said individual coils having a pitch substantially equal to the diameter of said wire, said closing coils comprising said flattened portion of the wire and providing a seating portion for said coil spring.

HOWARD HOY CLARK.